US008301899B2

(12) United States Patent
Millar (10) Patent No.: US 8,301,899 B2
(45) Date of Patent: Oct. 30, 2012

(54) METHOD AND APPARATUS FOR FACILITATING PASSWORD ACCESS TO A DEVICE

(75) Inventor: Greg Max Millar, Coarsegold, CA (US)

(73) Assignee: Pelco, Inc., Clovis, CA (US)

( * ) Notice: Subject to any disclaimer, the term of this patent is extended or adjusted under 35 U.S.C. 154(b) by 1017 days.

(21) Appl. No.: 11/900,723

(22) Filed: Sep. 11, 2007

(65) Prior Publication Data

US 2008/0109896 A1    May 8, 2008

Related U.S. Application Data

(60) Provisional application No. 60/843,697, filed on Sep. 11, 2006.

(51) Int. Cl.
*G06F 21/00* (2006.01)
(52) U.S. Cl. ............................. 713/183; 726/19; 726/26
(58) Field of Classification Search .................. 713/183
See application file for complete search history.

(56) References Cited

U.S. PATENT DOCUMENTS

| 6,480,958 | B1 * | 11/2002 | Harrington | 713/184 |
|---|---|---|---|---|
| 2004/0178881 | A1 * | 9/2004 | Otsubo et al. | 340/5.54 |
| 2006/0103623 | A1 * | 5/2006 | Davis | 345/156 |
| 2007/0033647 | A1 * | 2/2007 | Yang et al. | 726/18 |
| 2007/0143615 | A1 * | 6/2007 | Hiitola et al. | 713/172 |

\* cited by examiner

*Primary Examiner* — Shewaye Gelagay
(74) *Attorney, Agent, or Firm* — Hamilton, Brook, Smith & Reynolds, P.C.

(57) ABSTRACT

A method of and apparatus for allowing a user to access an electronic device by entering a password from a first device having alphabetic letter keys and numerical digit keys and a second device having primarily numerical digit keys comprising creating an alphabetic letter conversion relationship between the alphabetic letter keys of the first device with the numerical digit keys of the second device, creating a numerical digit conversion relationship between the numerical digit keys of the first device with the numerical digit keys of the second device, receiving a first password entered from the first device having alphabetic letter keys and numerical digit keys, converting the first password to a second password that can be entered from the second device having primarily numerical digit keys by using the alphabetic letter conversion relationship and the numerical digit conversion relationship, and allowing a user to access the electronic device if the user enters the first password or the second password.

11 Claims, 7 Drawing Sheets

METHOD AND APPARATUS FOR FACILITATING PASSWORD ACCESS TO A DEVICE

CROSS-REFERENCE TO RELATED APPLICATIONS

This application relates to and claims priority to U.S. Provisional Patent Application Ser. No. 60/843,697, filed Sep. 11, 2006, entitled DIGITAL VIDEO RECORDER, the entirety of which is incorporated herein by reference.

STATEMENT REGARDING FEDERALLY SPONSORED RESEARCH OR DEVELOPMENT

N/A

BACKGROUND OF THE INVENTION

This invention relates to controlling access to a device and, in particular, to facilitating the process of entering a user password using different user input devices.

Computer users have become accustomed to entering passwords using a personal computer keyboard. These passwords can be complex including both alphabetic letters and numeric digits. The complete sets of letter keys and number keys on standard keyboards make it relatively easy to enter the passwords. Other equipment, such as digital video recorders used in the video surveillance industry, normally do not have a standard keyboard attached to them thereby making it difficult for users to enter passwords to access the device. However, the very nature of a video surveillance system requires that the system be secure and that access only be granted to authorized personnel. Accordingly, there has been a long felt need in the industry for a way to facilitate entering of passwords using different user input devices while limiting the number of passwords that a user must remember.

SUMMARY OF THE INVENTION

In accordance with the present invention there is provided a method of allowing a user to access an electronic device by entering a password from a first device having alphabetic letter keys and numerical digit keys and a second device having primarily numerical digit keys. The method comprises the steps of creating an alphabetic letter conversion relationship between the alphabetic letter keys of the first device with the numerical digit keys of the second device, creating a numerical digit conversion relationship between the numerical digit keys of the first device with the numerical digit keys of the second device, receiving a first password entered from the first device having alphabetic letter keys and numerical digit keys, converting the first password to a second password that can be entered from the second device having primarily numerical digit keys by using the alphabetic letter conversion relationship created in the alphabetic letter conversion creating step and the numerical digit conversion relationship created in the numerical digit conversion creating step, and allowing a user to access the electronic device if the user enters the first password or the second password.

There is also provided in accordance with the present invention an apparatus for controlling access to an electronic device. The apparatus comprises a processor, memory connected to the processor, an input port for connecting a first user input device having alphabetic letter keys and numerical digit keys, and an input port for connecting a second user input device having primarily numerical digit keys. The processor is programmed to convert a first alphanumeric password entered from the first user input device to a second password that can be entered from the second user input device so that a user only has to remember a single password.

In addition, the present invention provides a method of granting access to a device comprising the steps of entering a first password having a first number of alphanumeric characters using a first set of keys having a first number of keys and requiring a first number of keystrokes to enter the first password, creating a second password, which requires the first number of keystrokes to enter the second password, such that the second password can be entered using a second set of keys which is less than the first number of keys, and granting access to the device when the first or second password is entered by a user.

The present invention allows a user to easily create a complex password comprising alphabetic letters and numerical digits on a standard personal computer keyboard or other suitable keyboard and then easily enter the same password on a numeric keypad, such as a numeric keypad that is part of surveillance system controller or a numeric keypad simulated on the screen of a monitor connected to the device. The present invention facilitates the setup of devices that do not have their own keyboard, such as digital video recorders used in the surveillance industry. These digital video recorders can be connected to a network consisting of numerous cameras and digital video recorders. A system administrator, manger, operator, or other personnel need to login to access the digital video recorder to perform setup tasks or to periodically perform various functions associated with the digital video recorder or cameras recorded by the digital video recorder. Generally, such digital video recorders are equipped with minimal control buttons for a user to interface with the device.

The method of the present invention enables a user to enter a complex password containing numerical digits and alphabetic letters on, for example, a personal computer keyboard connected to the device or system and later enter the alternate password on a number pad without the need to enter multiple strokes to select characters. In addition, the method of the present invention does not require a dictionary to construct likely words from the numeric input.

As used herein, a device can be a single, stand-alone device, a device connected to a network or a system of devices connected by a network.

Other advantages and applications of the present invention will be made apparent by the following detailed description of the preferred embodiment of the invention.

DETAILED DESCRIPTION OF THE INVENTION

Figure 1:
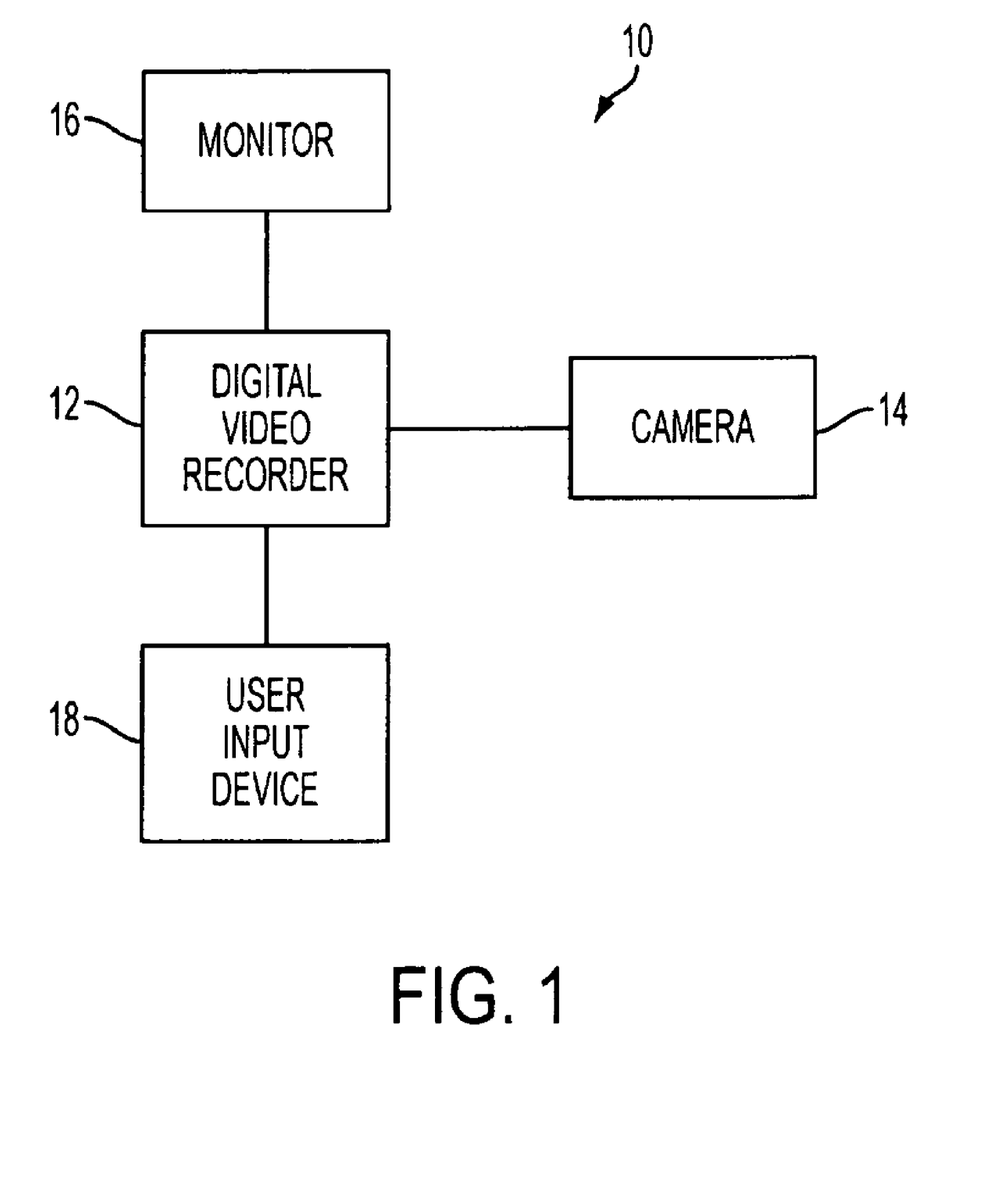
FIG. 1 is a block diagram of a video surveillance system for utilizing the present invention.

Referring to FIG. 1, a video surveillance system 10 for utilizing the present invention is shown. Video surveillance system 10 comprises a digital video recorder 12 connected to a camera 14, monitor 16, and user input device 18. User input device 18 can be a personal computer keyboard, control console for use with a surveillance system, a numeric keypad, and the like. In addition, the user can also utilize a mouse to further facilitate the user input process. The user input devices can be hardwired to the digital video recorder or wireless. Camera 14 and monitor 16 can be connected directly to digital video recorder 12 through appropriate inputs or through a local or wide area network, such as the Internet. Surveillance system 10 shows a single camera 14 connected to digital video recorder 12; however, such systems usually have a plurality of cameras connected to digital video recorder 12. In addition, user input device 18 could include a suitable communication interface so that user input device 18 communicates with digital video recorder 12 over a network.

Figure 2:
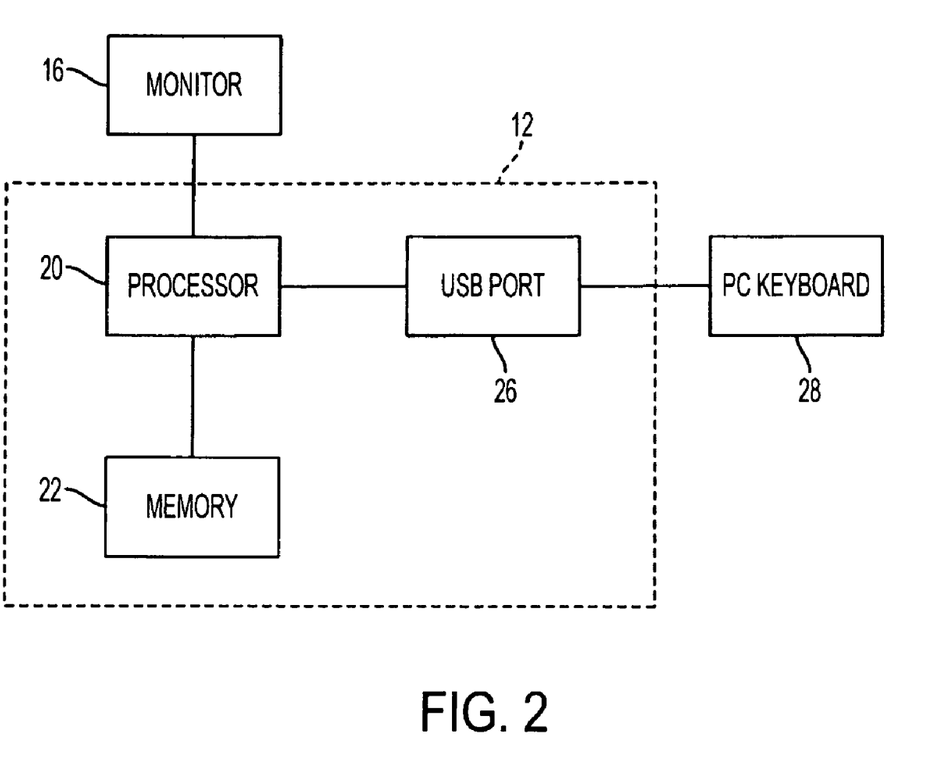
FIG. 2 is a block diagram of one embodiment of a system utilizing the present invention.

One embodiment of a system utilizing the present invention is illustrated in FIG. 2. In this embodiment, digital video recorder 12 comprises a processor 20 connected to memory 22 and USB port 26. Processor 20 is also connected to monitor 16. A PC keyboard 28 is connected to USB port 26. When a new user is authorized to access digital video recorder 12, the new user must enter a username and password. The password can contain numerical digits from 0 through 9 and alphabetic letters "A" through "Z". The user enters the password through PC keyboard 28. Processor 20 registers the password and stores it in memory 22. Processor 20 generates an alternate password which is also stored in memory 22. Processor 20 is programmed so that the user can enter either the original password or the alternate password and gain access to the authorized functions for this particular user.

Figure 3:
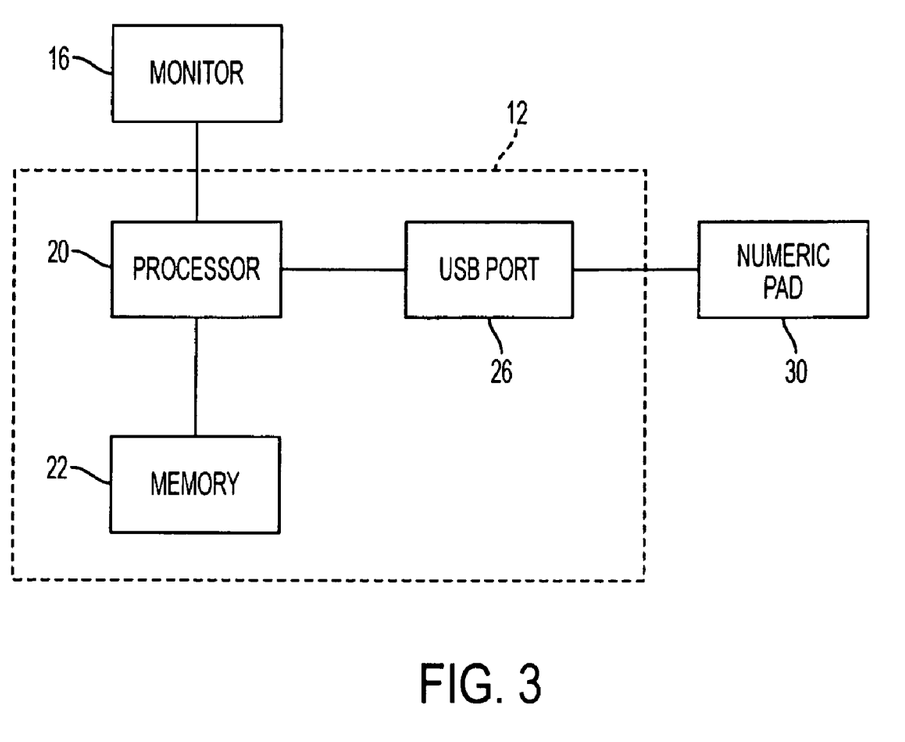
FIG. 3 is a block diagram of one embodiment of a system utilizing the present invention.

FIG. 3 illustrates another embodiment of a system utilizing the present invention in which a numeric pad 30 has been connected to USB port 26. Numeric pad 30 contains primarily numeric digit keys for entering the alternate password.

Figure 4:
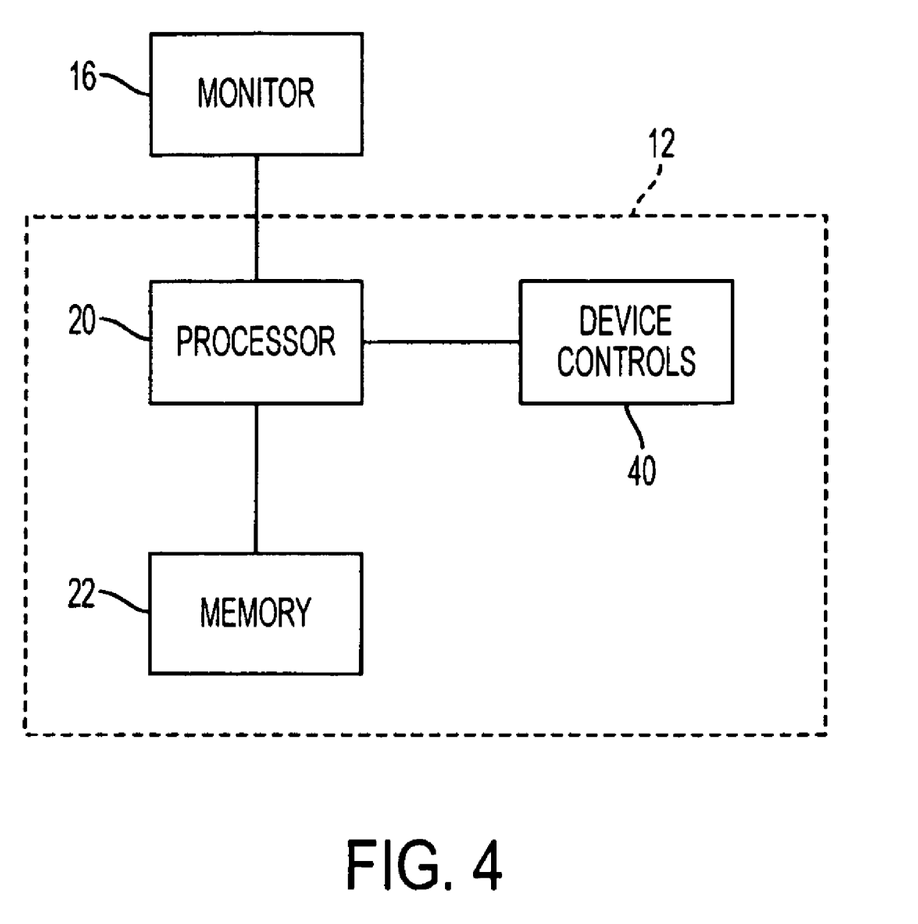
FIG. 4 is a block diagram of one embodiment of a system utilizing the present invention.
Figure 5:
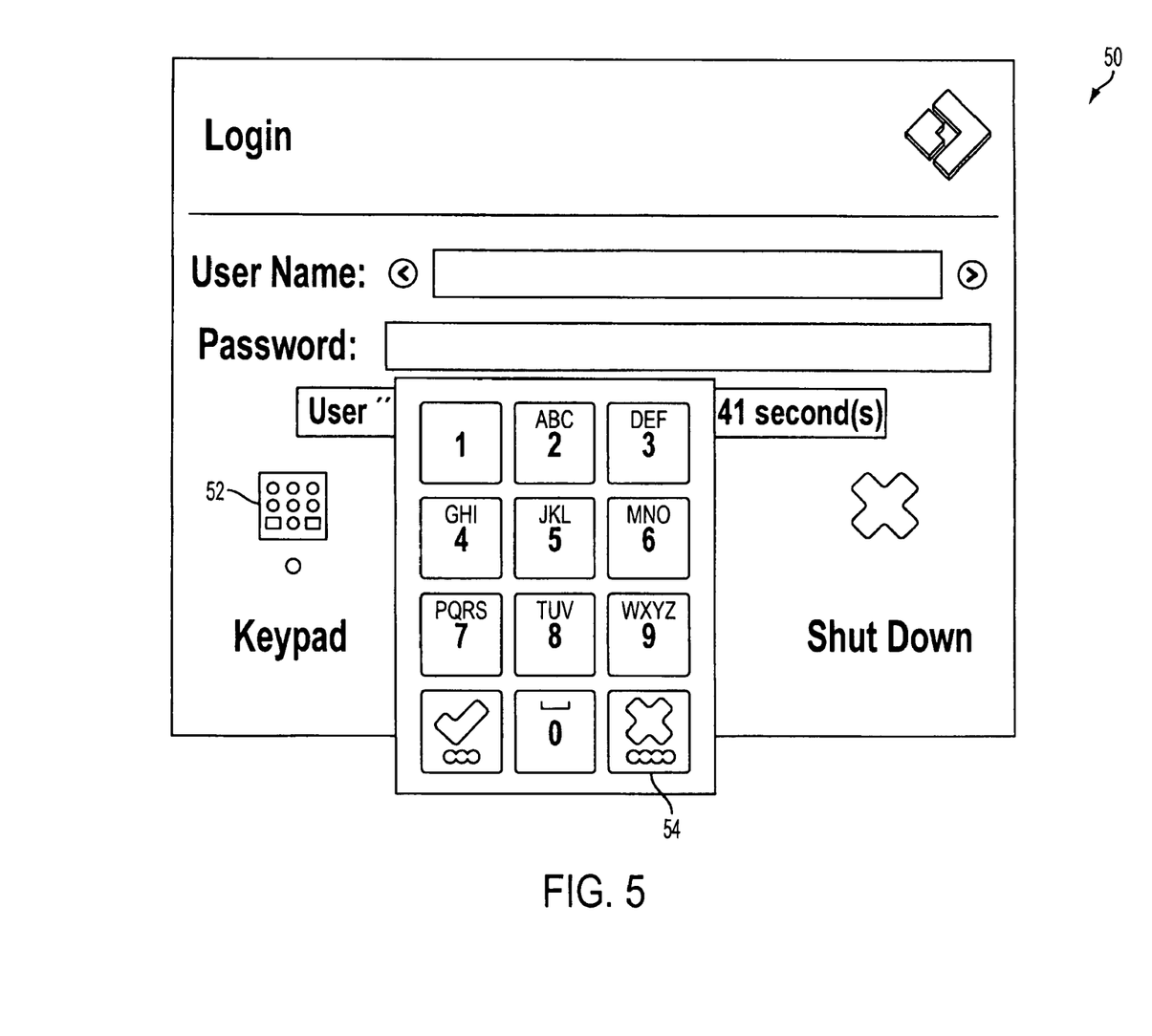
FIG. 5 is a diagrammatic view of a window from a screen display for implementing the present invention.

Another embodiment of a system utilizing the present invention is illustrated in FIG. 4 in which digital video recorder 12 has a plurality of buttons and other controls, such as a jog-shuttle, indicated by device controls 40. Device controls 40 are connected to processor 20 and can be used to operate digital video recorder 12 and to interface with a login dialog box such as the one shown in FIG. 5. Processor 20 can be configured to automatically provide a login screen or login dialog box 50 on monitor 16 when digital video recorder 12 is started or whenever a predetermined button or combination of buttons in device controls 40 are pushed by a user. FIG. 5 shows keypad icon 52 which can be activated with device controls 40 to cause processor 20 to present an on-screen numeric pad, such as number pad 54. Number pad 54 illustrates the letters of the alphabet that are associated with the individual number keys on a standard telephone keypad; however, the letters of the alphabet can be associated with the individual number keys in other ways. As indicated in FIG. 5, the letters can be associated with the number keys as follows: letters A, B, and C with the number 2; letters D, E, and F with the number 3; letters G, H, and I, with the number 4; letters J, K, and L with the number 5; letters M, N, and O with the number 6; letters P, Q, R, and S with the number 7; letters T, U, and V with the number 8; and the letters W, X, Y, and Z with the number 9.

Figure 6:
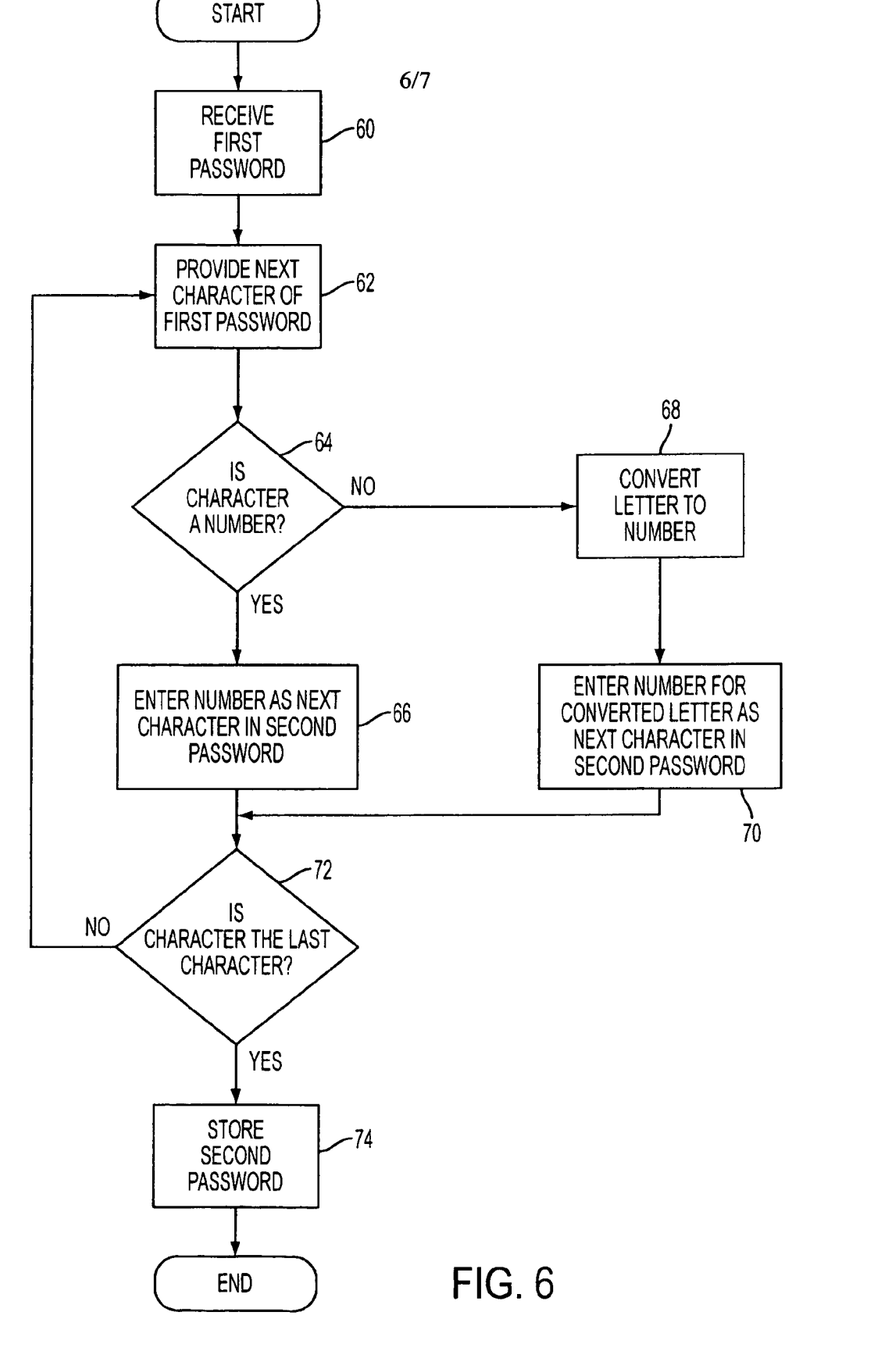
FIG. 6 is a flowchart illustrating a process for implementing the present invention.

The method of generating an alternative password implemented in processor 20 is illustrated in FIG. 6. At block 60 a first password is received. The characters in the first password are analyzed and converted so the first password will be mapped to a second, alternate password. Block 62 provides the next character in the first password to decision point 64, where processor 20 determines whether the first character is a number. If the character is a number, then processor 20 proceeds to block 66 where processor 20 enters the number as the next character of the second password. If the character is not a number, then processor 20 proceeds to block 68 where the letter is converted to the number associated with that letter as discussed above. At block 70, the number associated with the letter from the first password is entered as the next character in the second password. At decision point 72, processor 20 then determines whether the first password character that was just analyzed is the last character in the first password. If it is the last character, then at block 74 the second password is stored in memory 22. If it is not the last character, processor 20 returns to block 62 where the next character in the first password is provided. In addition, if desired, a space character " " can also be provided by using, for example, the key for the number "0". For example, if the user's first password was "USER4 PASSWORD1" then the second password would be "873740727796731". Accordingly, the user could easily enter "USER4 PASSWORD1" from a standard keyboard, such as pc keyboard 22 using both alphabetic letter keys and numeric digit keys or "873740727796731" from a numeric pad such as numeric pad 30 or by interacting with a simulated numeric pad displayed on a monitor, such as number pad 54.

Figure 7:
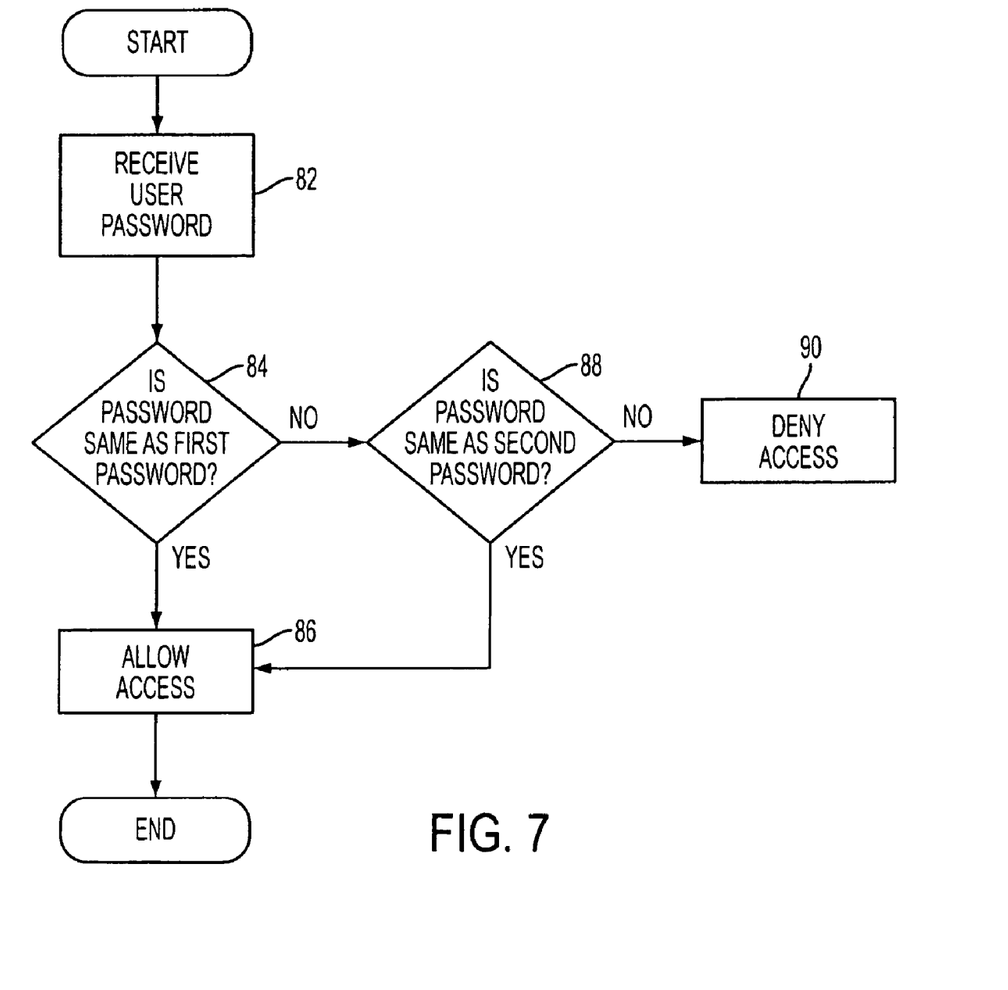
FIG. 7 is a flowchart illustrating a process for implementing the present invention.

FIG. 7 illustrates one embodiment for implementing the present invention. Processor 20 receives a user password at block 82. At decision point 84, processor 20 determines if the password received in block 82 is the same as the first password previously entered at block 60. If the passwords match, then at block 86 processor 20 allows the user access to digital video recorder 12. If the password does not match the first password previously entered at block 60, then at decision point 88 processor 20 determines if the password received in block 82 matches the second password stored previously at block 74. If the passwords match, then at block 86 processor 20 allows the user access to digital video recorder 12. If the password does not match the second password stored previously at block 74, then the user is denied access at block 90.

In this exemplary system for utilizing the present invention, reference is made to digital video recorder 12 as the device to be accessed by a user; however, it should be understood that the present invention can be use with other devices and that such devices can be a single, stand-alone device, a device connected to a network or a system of devices connected by a network. In addition, it should be noted that although the user input device is connected directly to the device to be accessed by the user, the user could access the device over a local area network or wide area network, such as the Internet. For example, using Internet Protocol based networking, a user can have remote accessibility and control of digital video recorder 12.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of allowing a user to access an electronic device by entering a password from one of a first device having alphabetic letter keys and numerical digit keys and a second device having primarily numerical digit keys, said method comprising the steps of: storing in memory an alphabetic letter conversion relationship between the alphabetic letter keys of the first device with the numerical digit keys of the second device; storing in memory a numerical digit conversion relationship between the numerical digit keys of the first device with the numerical digit keys of the second device; receiving a first password from a first user entering the first password on the first device; storing in memory the first password from the first user; generating a second password for the first user for entering on the second device having primarily numerical digit keys by using the stored alphabetic letter conversion relationship and the stored numerical digit conversion relationship; storing in memory the second password for the first user; providing the second password to the first user; and allowing the first user to access the electronic device repeatedly by entering the first password on the first device or the second password on the second device.

2. A method as recited in claim 1 wherein the second password generating step comprises converting the alphabetic letters to the digits associated with the numerical digit keys on a telephone keypad.

3. A method as recited in claim 2 wherein the second password generating step comprises converting each of the numerical digit keys from the first device to the numerical digit key in the second device that represents the same numerical digit.

4. A method as recited in claim 2 wherein the second password generating step comprises converting the letters A, B, and C to the number 2, the letters D, E, and F to the number 3, the letters G, H, and I, to the number 4, the letters J, K, and L to the number 5, the letters M, N, and O to the number 6, the letters P, Q, R, and S to the number 7, the letters T, U, and V to the number 8, and the letters W, X, Y, and Z to the number 9.

5. A method as recited in claim 1 wherein said method further comprises the step of generating a simulated numeric pad for display on a monitor and the step of providing control functions to a user to enable the user to interact with the simulated numeric pad.

6. An apparatus for controlling access to an electronic device, said apparatus comprising: a processor; memory connected to said processor; an input port for connecting a first user input device having alphabetic letter keys and numerical digit keys; and an input port for connecting a second user input device having primarily numerical digit keys, wherein said processor is programmed to store in the memory an alphabetic letter conversion relationship between the alphabetic letter keys of the first device with the numerical digit keys of the second device, to store in the memory a numerical digit conversion relationship between the numerical digit keys of the first device with the numerical digit keys of the second device, to receive a first password from a first user entering the first password on the first device, to store in memory the first password from the first user, to generate a second password for the first user for entering on the second device having primarily numerical digit keys by using the stored alphabetic letter conversion relationship and the stored numerical digit conversion relationship, to store in memory the second password for the first user, to provide the second password to the first user, and to allow the first user to access the electronic device repeatedly by entering the first password on the first device or the second password on the second device.

7. An apparatus as recited in claim 6 wherein the stored alphabetic letter conversion relationship converts the alphabetic letter keys from said first user input device to the digits associated with the numerical digit keys on a telephone keypad.

8. An apparatus as recited in claim 7 wherein the stored numerical digit conversion relationship converts each of the numerical digit keys from said first user input device to the numerical digit keys in said second user input device that represents the same numerical digit.

9. An apparatus as recited in claim 7 wherein the stored alphabetic letter conversion relationship converts the alphabetic letter keys from said first user input device to the numerical digit keys from said second user input device by converting the letters A, B, and C to the number 2, the letters D, E, and F to the number 3, the letters G, H, and I, to the number 4, the letters J, K, and L to the number 5, the letters M, N, and O to the number 6, the letters P, Q, R, and S to the number 7, the letters T, U, and V to the number 8, and the letters W, X, Y, and Z to the number 9.

10. An apparatus as recited in claim 6 wherein said apparatus is a digital video recorder.

11. An apparatus as recited in claim 6 wherein said processor generates a simulated numeric pad for display on a monitor and wherein said apparatus further comprises an input device for a user to interact with said simulated numeric pad.

* * * * *